United States Patent [19]

Tanaka et al.

[11] Patent Number: 4,959,042
[45] Date of Patent: Sep. 25, 1990

[54] LAYOUT OF AUXILIARY MECHANISMS FOR AN ENGINE

[75] Inventors: Hideki Tanaka; Kyoichi Umemura, both of Hiroshima, Japan

[73] Assignee: Mazda Motor Corporation, Hiroshima, Japan

[21] Appl. No.: 350,992

[22] Filed: May 12, 1989

[30] Foreign Application Priority Data

May 13, 1988 [JP] Japan .................................. 63-116402
May 13, 1988 [JP] Japan .................................. 63-116403

[51] Int. Cl.⁵ .............................................. F16H 7/12
[52] U.S. Cl. ...................................... 474/134; 474/135
[58] Field of Search ...................... 474/101, 109–111, 474/113, 133, 134, 137, 148, 84–89

[56] References Cited

U.S. PATENT DOCUMENTS

| | | | |
|---|---|---|---|
| 4,351,636 | 9/1982 | Hager | 474/135 |
| 4,525,151 | 6/1985 | Tomita et al. | 474/134 X |
| 4,723,934 | 2/1988 | Thomey | 474/135 |
| 4,798,564 | 1/1989 | Benedict | 474/134 |

FOREIGN PATENT DOCUMENTS 62-143045 9/1987 Japan .

Primary Examiner—Thuy M. Bui
Attorney, Agent, or Firm—Sixbey, Friedman, Leedom & Ferguson

[57] ABSTRACT

Auxiliary mechanisms for an engine are arranged in the order of rotational inertia force so that the rotational inertia force of the auxiliary mechanism nearest to the crankshaft pulley as seen toward the tight side of auxiliary mechanism driving belt from the crankshaft pulley is the largest.

24 Claims, 8 Drawing Sheets

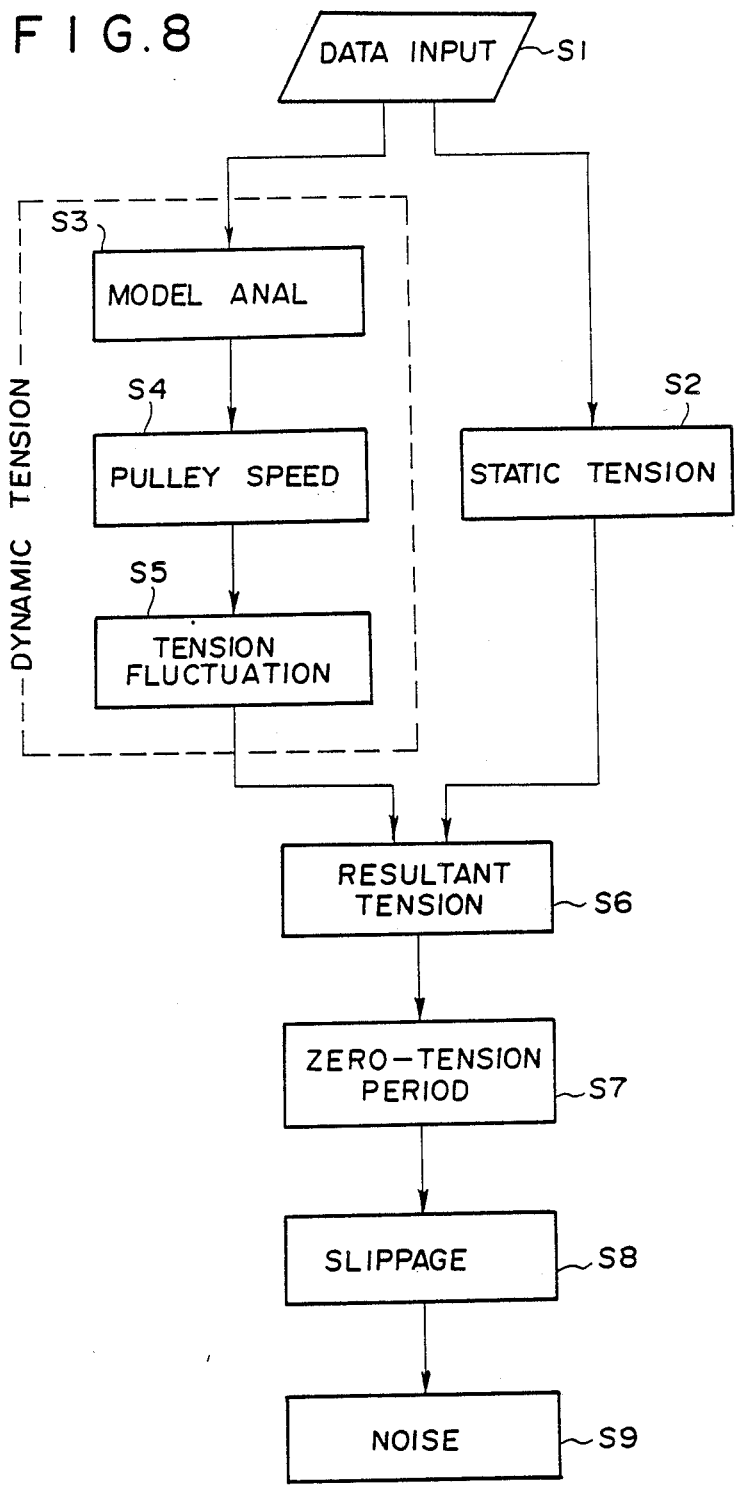

LAYOUT OF AUXILIARY MECHANISMS FOR AN ENGINE

BACKGROUND OF THE INVENTION

1. Field of the Invention

This invention relates to a layout of auxiliary mechanisms for an engine which are driven by the crankshaft of the engine by way of a driving belt.

2. Description of the Prior Art

As is well known, the auxiliary mechanisms for the engine, e.g., a compressor for an air conditioner, an alternator, an oil pump for a power-steering system, a cooling water pump and the like are driven by an auxiliary mechanism driving belt which is a V-belt such as a V-ribbed belt passed around the crank pulley and pulleys for the auxiliary mechanisms. See Japanese Unexamined Utility Model Publication No. 62(1987)-143045, for instance.

When the tension on the auxiliary mechanism driving belt is too high, durability of the auxiliary mechanism driving belt and the auxiliary mechanisms is deteriorated. On the other hand, when the tension on the auxiliary mechanism driving belt is too low, excessive slip occurs, which leads to production of noise.

Recently, production of belt noise due to fluctuation in revolution of the crank pulley caused by torque fluctuation which is due to increase in load of the auxiliary mechanisms and/or the condition of combustion in the engine has become a serious problem.

Generally, the noise of the auxiliary mechanism driving belt is apt to be produced when the load of the auxiliary mechanisms is increased while the tension on the auxiliary mechanism driving belt is low, and this tendency is especially strong in the automatic transmission vehicle in which the inertia moment of the crankshaft is small and factors which can promote fluctuation in the engine revolution such as fluid resistance exist. As the noise of the auxiliary mechanism driving belt, there have been known noise which is produced due to slip of the belt in the radial direction of the pulley and noise which is produced due to slip of the belt in the tangential direction of the pulley. In the case of the V-ribbed belt, it is considered that the noise is produced mainly due to the slip of the belt in the tangential direction of the pulley in view of the fact that the slip of the belt in the radial direction of the pulley is less and the noise is produced only when the tension on the belt is low.

FIG. 11 shows the relation between the peripheral speeds of the crankshaft pulley, the air conditioner compressor pulley and the auxiliary mechanism driving belt and the crank angle (the engine revolution). As can be understood from FIG. 11, the noise is produced in synchronization with the fluctuation in the engine revolution and at about 45 degrees ATDC, that is, immediately after combustion. Simultaneously with the production of the noise, the belt speed becomes lower than the peripheral speed of the crank pulley.

SUMMARY OF THE INVENTION

In view of the foregoing observations and description, the primary object of the present invention is to provide an improved layout of the auxiliary mechanisms which can suppress production of the noise of the auxiliary mechanism driving belt.

The present invention has been achieved through an investigation of the mechanism of production of the noise of the auxiliary mechanism driving belt and is characterized in that the auxiliary mechanisms are arranged in the order of rotational inertia force so that the rotational inertia force of the auxiliary mechanism nearest to the crankshaft pulley as seen toward the tight side of auxiliary mechanism driving belt from the crankshaft pulley is the largest.

BRIEF OF THE DRAWINGS

FIG. 1 is a schematic view showing a layout of auxiliary mechanisms in accordance with a first embodiment of the present invention, FIG. 2 is a schematic view showing a layout of auxiliary mechanisms in accordance with a second embodiment of the present invention, FIG. 3 is a schematic view showing a layout of auxiliary mechanisms in accordance with a third embodiment of the present invention, FIG. 4 is a schematic view showing a layout of auxiliary mechanisms in accordance with a fourth embodiment of the present invention, FIG. 5 is a schematic view showing a layout of auxiliary mechanisms in accordance with a fifth embodiment of the present invention, FIG. 6 is a view for illustrating the effect of the invention, FIG. 7A and 7B show a result of measurement of the relation between the production of the belt noise and the fluctuation in the belt tension, FIG. 8 shows a flow chart for illustrating an example of a simulation computation for predicting the tension fluctuation in a given auxiliary mechanism layout, FIG. 9 is a schematic view showing another embodiment of the present invention, FIG. 10 is a schematic cross-sectional view showing a modification of the tensioner employed in the embodiment shown in FIG. 9, and FIG. 11 shows the relation between the peripheral speeds of the crankshaft pulley, the air conditioner compressor pulley and the auxiliary mechanism driving belt and the crank angle.

DESCRIPTION OF THE PREFERRED EMBODIMENTS

Figure 1:
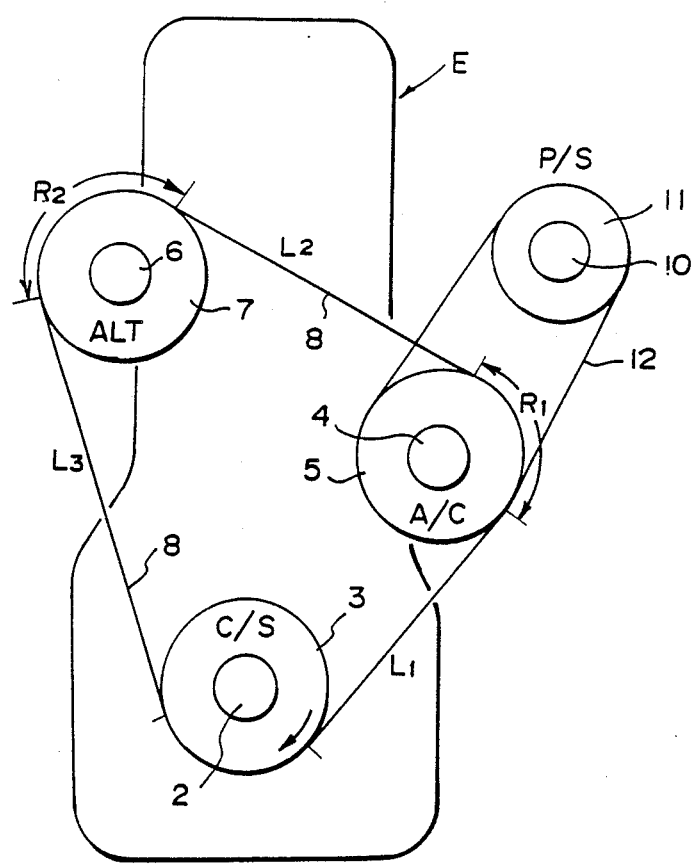

In FIG. 1, reference numerals 3, 5 and 7 respectively denote a crankshaft pulley mounted on a crankshaft 2 of an engine E, an air conditioner pulley for an air conditioner compressor 4, and an alternator pulley for an alternator 6. A main auxiliary mechanism driving belt 8 is passed around the crankshaft pulley 3, the air conditioner pulley 5 and the alternator pulley 7. A secondary auxiliary mechanism driving belt 12 is passed around the air conditioner pulley 5 and a power-steering pulley 11 for an oil pump 10 of a power-steering system.

In this embodiment and the following embodiments, the rotational inertia forces of the auxiliary mechanisms are assumed to have the following values.

| air conditioner compressor | 0.058 Kg-fS$^2$/cm |
|---|---|
| alternator | 0.03 Kg-fS$^2$/cm |
| oil pump for power steering | 0.015 Kg-fS$^2$/cm |
| water pump | 0.015 Kg-fS$^2$/cm |

In this embodiment, the crankshaft pulley 3 is clockwisely revolved as seen in FIG. 1 and the main auxiliary mechanism driving belt 8 runs in the clockwise direction. Accordingly, the tight side of the main auxiliary mechanism driving belt 8 is on the upstream side of the crankshaft pulley 3. As described above, in accordance with the present invention, the auxiliary mechanisms are arranged in the order of rotational inertia force so that the rotational inertia force of the auxiliary mechanism nearest to the crankshaft pulley 3 as seen toward the tight side of the main auxiliary mechanism driving belt 8 from the crankshaft pulley 3 is the largest. Accordingly, the air conditioner compressor 4 and the alternator 6 are arranged in this order as viewed in the counterclockwise direction from the crankshaft pulley 3 since the rotational inertia force of the former is larger than that of the latter. Further, the secondary auxiliary mechanism driving belt 12 for driving the oil pump 10 of the power-steering system is passed around the air conditioner pulley 5 for the air conditioner compressor 4 which has an rotational inertia force larger than that of the alternator 6. The rotational inertia force is determined by the rotating mass of the auxiliary mechanism and the radius of rotation of the pulley of the auxiliary mechanism, and changes depending on the diameter of the pulley.

The inter-pulley belt length L1 between the crankshaft pulley 3 and the air conditioner pulley 5, the inter-pulley belt length L2 between the air conditioner pulley 5 and the alternator pulley 7, and the inter-pulley belt length L3 between the alternator pulley 7 and the crankshaft pulley 3 become longer in this order (L1<L2<L3). That is, the inter-pulley lengths are set so that the inter-pulley length is larger between the pair of pulleys nearer to the crankshaft pulley 3 as seen toward the tight side of the belt 8 from the crankshaft pulley 3. The angle of contact R1 of the main auxiliary mechanism driving belt 8 at the air conditioner pulley 5 is smaller than the angle of contact R2 of the main auxiliary mechanism driving belt 8 at the alternator pulley 7.

The angular velocity of the crankshaft 2 fluctuates according to the combustion cycles of the engine and the auxiliary mechanisms 4, 6 and 10 are driven by the crankshaft 2 the angular velocity of which fluctuates. When the fluctuation in the angular velocity on the slack side is large, the slippage at the crankshaft pulley 3 due to the difference between the angular velocity of the crankshaft pulley 3 and the speed of the main auxiliary mechanism driving belt 8 is increased and noise is produced. The fluctuation in the angular velocity depends upon the rotational inertia forces of the respective auxiliary mechanisms 4, 6 and 10, the inter-pulley belt lengths and the rigidity of the belt. That is, the fluctuation in the angular velocity tends to increase as the rotational inertia force increases, and to increase as the inter-pulley length increases and the rigidity of the belt is reduced.

When the auxiliary mechanisms are arranged in the order of rotational inertia force so that the rotational inertia force of the auxiliary mechanism nearest to the crankshaft pulley 3 as seen toward the tight side of auxiliary mechanism driving belt 8 from the crankshaft pulley 3 is the largest, the fluctuation in the angular velocity of the air conditioner pulley 5 for a given fluctuation in the angular velocity of the crankshaft pulley 3 can be reduced. The fluctuation in the tension T3 of the belt 8 on the slack side is thereby suppressed, and the period during which the slack side tension T3 is nullified when the tight side tension T1 is maximized is shortened, and the slippage at the crankshaft pulley 3 which is due to the difference between the angular velocity of the crankshaft pulley 3 and the speed of the belt 8 and leads to production of noise is reduced. For example, if the order of the auxiliary mechanism having the largest rotational inertia force is shifted toward the slack side, the length of the belt between the auxiliary mechanism and the crankshaft pulley 3 as seen toward the tight side of the belt 8 becomes longer and the effective spring constant of the belt 8 is lowered, whereby the rotational displacement of the pulley is enlarged and the fluctuation in tension is increased. Further, the natural frequency of the system approaches the exciting frequency as the spring constant of the belt 8 is reduced, and the fluctuation in the tension is amplified.

Further, in this embodiment, the secondary auxiliary mechanism driving belt 12 drives the auxiliary mechanism having the smallest rotational inertia force and is driven by way of the air conditioner pulley 5 which is nearest to the crankshaft pulley 3. That is, since the resiliency of the secondary auxiliary mechanism driving belt 12 increases the fluctuation in the tension of the main auxiliary mechanism driving belt 8, the secondary auxiliary mechanism driving belt 12 is driven by way of the air conditioner pulley 5 which is the nearest to the driving pulley, i.e., the crankshaft pulley 3 and the fluctuation in the angular velocity of which is the smallest and the oil pump 10 for the power steering system having the smallest rotational inertia force is driven by the secondary auxiliary mechanism driving belt 12, whereby the rotational displacement of the pulley is suppressed.

Though, in the first embodiment described above, the oil pump 10 for the power steering system is driven by the secondary auxiliary mechanism driving belt 12, all the auxiliary mechanisms may be driven by a single belt. Also in such a case, the auxiliary mechanisms are arranged in the order of rotational inertia force so that the rotational inertia force of the auxiliary mechanism nearest to the crankshaft pulley as seen toward the tight side of auxiliary mechanism driving belt from the crankshaft pulley is the largest, the inter-pulley lengths are set so that the inter-pulley length between a given pair of pulleys is larger between the pair of pulleys nearer to the crankshaft pulley 3 as seen toward the tight side of the belt 8 from the crankshaft pulley 3, and the angles of contact of the main auxiliary mechanism driving belt 8 at the pulleys of the auxiliary mechanisms are set so that the angle of contact is larger at the pulley nearer to the crankshaft pulley 3 as seen toward the tight side of the belt 8 from the crankshaft pulley 3.

Figure 2:
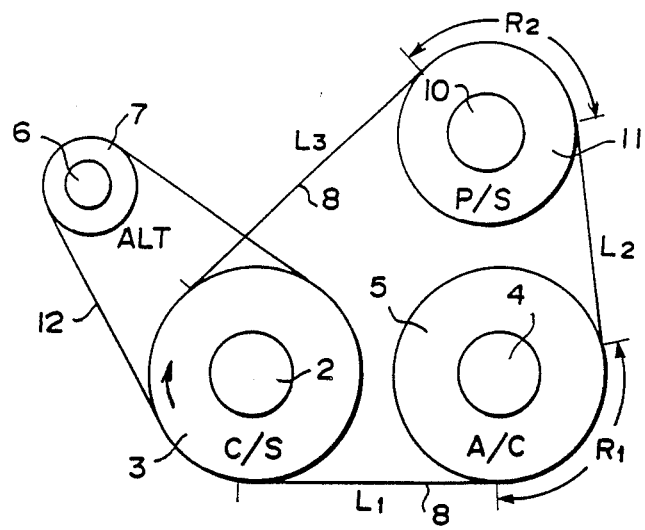

In the second embodiment of the present invention shown in FIG. 2, a main auxiliary mechanism driving belt 8 is passed around a crankshaft pulley 3, an air conditioner pulley 5 and a power-steering pulley 11, and a secondary auxiliary mechanism driving belt 12 passed around the crankshaft pulley 3 and an alternator pulley 7.

In this embodiment, the air conditioner compressor 4 which has a rotational inertia force larger than that of the oil pimp 10 is positioned nearer to the crankshaft pulley 3 than the oil pimp 10 as seen toward the tight side of the main auxiliary mechanism driving belt 8 from the crankshaft pulley 3. Further, the inter-pulley length L1 between the crankshaft pulley 3 and the air conditioner pulley 5 is the smallest and the inter-pulley length L3 between the power-steering pulley 11 and the crankshaft pulley 3 is the largest. The inter-pulley length L2 between the air conditioner pulley 5 and the power-steering pulley 11 is intermediate. The angle of contact R1 of the main auxiliary mechanism driving belt 8 at the air conditioner pulley 5 is smaller than the angle of contact R2 of the main auxiliary mechanism driving belt 8 at the power-steering pulley 11.

In this embodiment, the rotational displacement of the crankshaft pulley 3 is more reduced than in the first embodiment since the alternator pulley 7 is directly driven by the crankshaft pulley 3. Further, the second embodiment differs from the first embodiment in the freedom of layout of the auxiliary mechanisms which depends upon the space around the engine.

Figure 3:
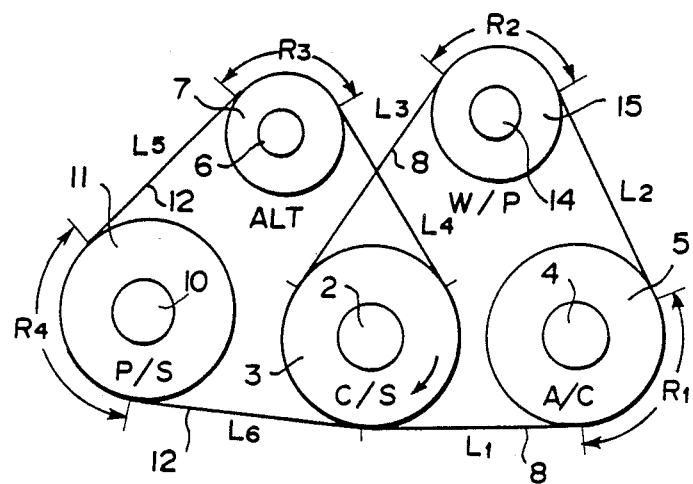

In the third embodiment of the present invention shown in FIG. 3, a main auxiliary mechanism driving belt 8 is passed around a crankshaft pulley 3, an air conditioner pulley 5 and a water pump pulley 15 for water pump 14, and a secondary auxiliary mechanism driving belt 12 passed around the crankshaft pulley 3, an alternator pulley 7 and power-steering pulley 11.

In this embodiment, the air conditioner compressor 4 which has a rotational inertia force larger than that of the water pump 14 is positioned nearer to the crankshaft pulley 3 than the water pump 14 as seen toward the tight side of the main auxiliary mechanism driving belt 8 from the crankshaft pulley 3. Similarly, the alternator 6 which has a rotational inertia force larger than that of the oil pump 10 is positioned nearer to the crankshaft pulley 3 than the oil pump 10 as seen toward the tight side of the secondary auxiliary mechanism driving belt 12 from the crankshaft pulley 3. Further, the inter-pulley length L1 of the main auxiliary mechanism driving belt 8 between the crankshaft pulley 3 and the air conditioner pulley 5 is the smallest and the inter-pulley length L3 between the water pump pulley 15 and the crankshaft pulley 3 is the largest. The inter-pulley length L2 between the air conditioner pulley 5 and the water pulley pump 15 is intermediate. As in the main auxiliary mechanism driving belt 8, the inter-pulley length L4 of the secondary auxiliary mechanism driving belt 12 between the crankshaft pulley 3 and the alternator pulley 7 is the smallest and the inter-pulley length L6 between the power-steering pulley 11 and the crankshaft pulley 3 is the largest. The inter-pulley length L5 between the alternator pulley 7 and the power-steering pulley 11 is intermediate. The angle of contact R1 of the main auxiliary mechanism driving belt 8 at the air conditioner pulley 5 is smaller than the angle of contact R2 of the main auxiliary mechanism driving belt 8 at the water pump pulley 15. Similarly, the angle of contact R3 of the secondary auxiliary mechanism driving belt 12 at the alternator pulley 7 is smaller than the angle of contact R4 of the secondary auxiliary mechanism driving belt 12 at the power-steering pulley 11.

Figure 4:
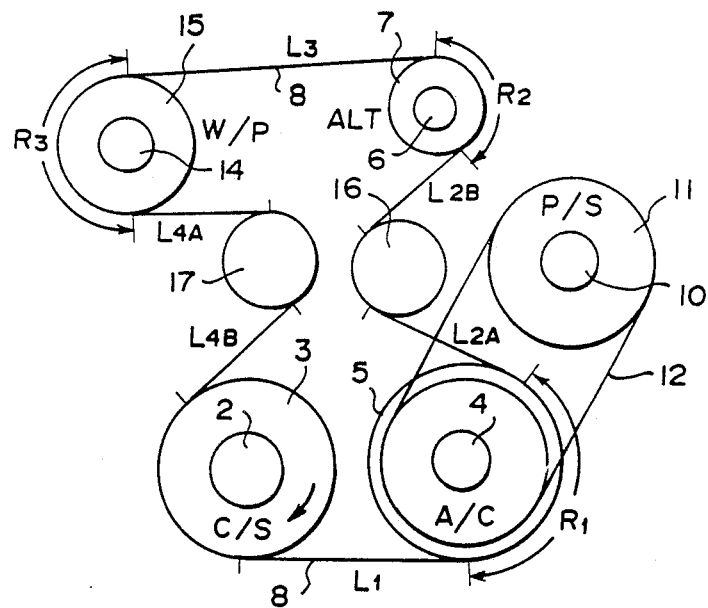

In the fourth embodiment shown in FIG. 4, a main auxiliary mechanism driving belt 8 is passed around a crankshaft pulley 3, an air conditioner pulley 5, an alternator pulley 7 and a water pump pulley 15. A secondary auxiliary mechanism driving belt 12 is passed around the air conditioner pulley 5 and a power-steering pulley 11. A pair of idlers 16 and 17 are disposed respectively between the air conditioner pulley 5 and the alternator pulley 7 and between the water pump pulley 15 and the crankshaft pulley 3.

Also in this embodiment, the air conditioner compressor 4, the alternator 6, and the water pump 14 are arranged in the order of rotational inertia force as seen toward the tight side of the main auxiliary mechanism driving belt 8 from the crankshaft pulley 3.

Further, the inter-pulley length L1 of the main auxiliary mechanism driving belt 8 between the crankshaft pulley 3 and the air conditioner pulley 5 is the smallest and the inter-pulley length L4 (L4=L4A+L4B) between the water pump pulley 15 and the crankshaft pulley 3 is the largest. The inter-pulley length L2 (L2=L2A+L2B) between the air conditioner pulley 5 and the alternator pulley 7 is the second smallest. The inter-pulley length L3 between the alternator pulley 7 and the water pump pulley 15 is the second largest. The angle of contact R1 of the main auxiliary mechanism driving belt 8 at the air conditioner pulley 5 is smaller than the angle of contact R2 of the main auxiliary mechanism driving belt 8 at the alternator pulley 7. Further, the angle of contact R2 of the main auxiliary mechanism driving belt 8 at the alternator pulley 7 is smaller than the angle of contact R3 of the main auxiliary mechanism driving belt 8 at the water pump pulley 15. As can be understood from FIG. 4, the angles of contact R1 to R3 are arranged in the manner described above by virtue of the idlers 16 and 17.

Figure 5:
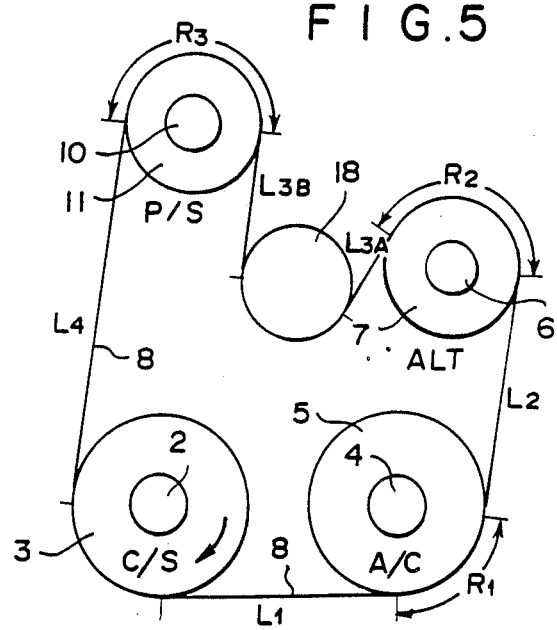

In the fifth embodiment shown in FIG. 5, a single auxiliary mechanism driving belt 8 is passed around a crankshaft pulley 3, an air conditioner pulley 5, an alternator pulley 7 and a power-steering pulley 11. An idler 18 is disposed between and the power-steering pulley 11.

Also in this embodiment, the air conditioner compressor 4, the alternator 6, and the oil pump 10 are arranged in the order of rotational inertia force as seen toward the tight side of the auxiliary mechanism driving belt 8 from the crankshaft pulley 3.

Further, the inter-pulley length L1 of the auxiliary mechanism driving belt 8 between the crankshaft pulley 3 and the air conditioner pulley 5 is the smallest and the inter-pulley length L4 between the power-steering pulley 11 and the crankshaft pulley 3 is the largest. The inter-pulley length L2 between the air conditioner pulley 5 and the alternator pulley 7 is the second smallest. The inter-pulley length L3 (L3=L3A+L3B) between the alternator pulley 7 and the power-steering pulley 11 is the second largest. The angle of contact R1 of the auxiliary mechanism driving belt 8 at the air conditioner pulley 5 is smaller than the angle of contact R2 of the auxiliary mechanism driving belt 8 at the alternator pulley 7. Further, the angle of contact R2 of the auxiliary mechanism driving belt 8 at the alternator pulley 7 is smaller than the angle of contact R3 of the auxiliary mechanism driving belt 8 at the power-steering pulley 11. As can be understood from FIG. 5, the angles of contact R1 to R3 are arranged in the manner described above by virtue of the idler 18.

Figure 6:
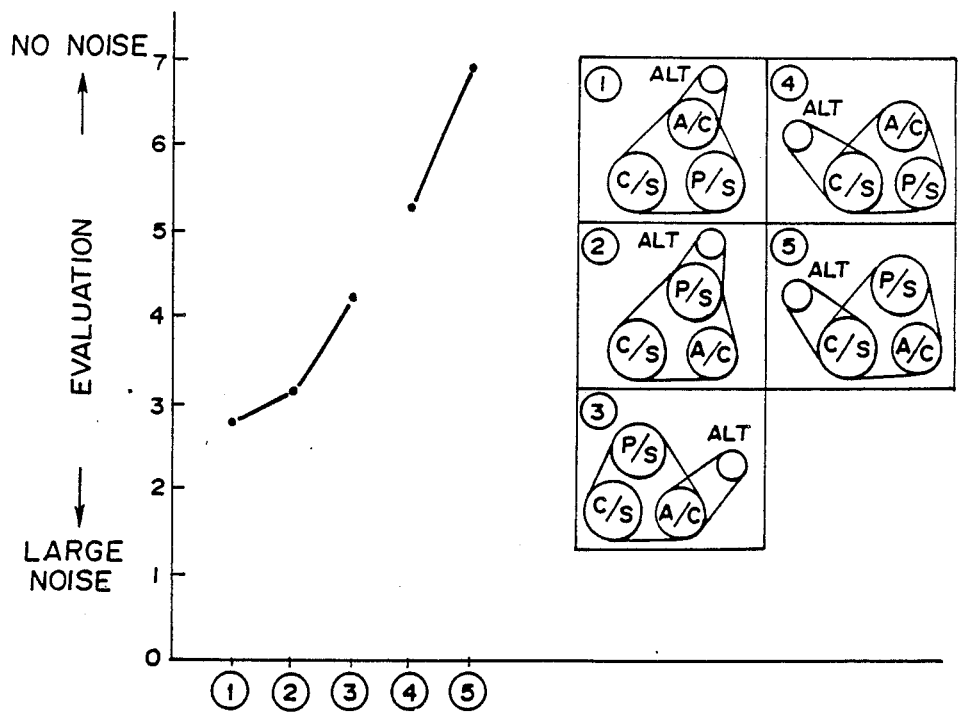

Three auxiliary mechanism layouts in accordance with the present invention and two control auxiliary mechanism layouts were prepared and production of noise in these layouts was evaluated. The result was shown in FIG. 6. In FIG. 6, evaluation 7 was given when almost no noise was produced, and as the noise level increased, lower evaluation was given. In the first control layout, the oil pump for the power-steering system having a rotational inertia force smaller than the air conditioner compressor was disposed between the crankshaft pulley and the air conditioner compressor as seen toward the tight side of the main auxiliary mechanism driving belt from the crankshaft pulley and the alternator is driven by the secondary auxiliary mechanism driving belt passed around the alternator pulley and the air conditioner pulley as shown in number 1 frame in FIG. 6. In the first layout in accordance with the present invention, the air conditioner compressor and the oil pump for the power-steering system having a rotational inertia force smaller than the air conditioner compressor were arranged in this order as seen toward the tight side of the main auxiliary mechanism driving belt from the crankshaft pulley and the alternator 6 was driven by the secondary auxiliary mechanism driving belt passed around the alternator pulley and the power-steering pulley as shown in number 2 frame in FIG. 6. In the second layout in accordance with the present invention (corresponding to the first embodiment described above), the air conditioner compressor and the oil pump for the power-steering system having a rotational inertia force smaller than the air conditioner compressor were arranged in this order as seen toward the tight side of the main auxiliary mechanism driving belt from the crankshaft pulley and the alternator 6 was driven by the secondary auxiliary mechanism driving belt passed around the alternator pulley and the air conditioner pulley as shown in number 3 frame in FIG. 6. In the second control layout, the oil pump for the power-steering system having a rotational inertia force smaller than the air conditioner compressor was disposed between the crankshaft pulley and the air conditioner compressor as seen toward the tight side of the main auxiliary mechanism driving belt from the crankshaft pulley and the alternator was driven by the secondary auxiliary mechanism driving belt passed around the alternator pulley and the crankshaft pulley as shown in number 4 frame in FIG. 6. In the third layout in accordance with the present invention (corresponding to the second embodiment described above), the air conditioner compressor and the oil pump for the power-steering system having a rotational inertia force smaller than the air conditioner compressor were arranged in this order as seen toward the tight side of the main auxiliary mechanism driving belt from the crankshaft pulley and the alternator 6 was driven by the secondary auxiliary mechanism driving belt passed around the alternator pulley and the crankshaft pulley as shown in number 5 frame in FIG. 6.

As can be understood from FIG. 6, the first layout in accordance with the present invention produced lower noise than the first control layout. However, in comparison with the second layout in accordance with the present invention, the first layout in accordance with the present invention produced higher noise. This is because, in the first layout, the alternator 6 is driven by the oil pump for power-steering system which has a rotational inertia force less than that of the air conditioner compressor. Further, the third layout in accordance with the present invention hardly produced noise. On the other hand, the second control layout in which the relative position of the air conditioner compressor and the oil pump is reverse to that in the third layout in accordance with the present invention produced much higher noise than the third layout.

Figure 7A:
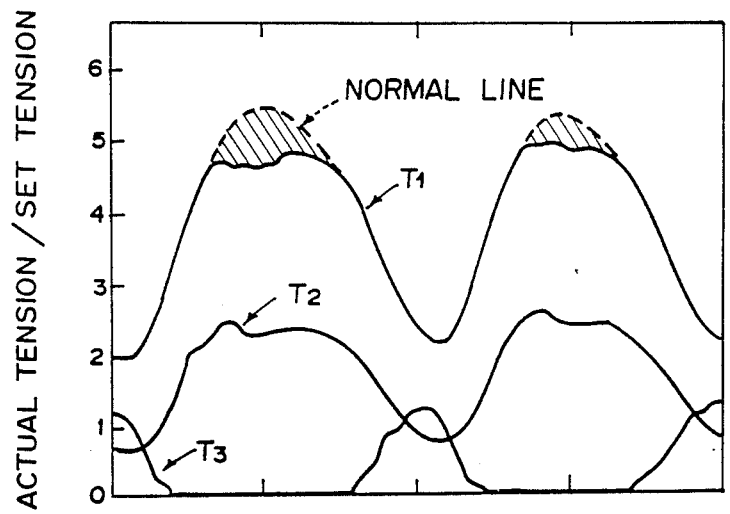
Figure 7B:
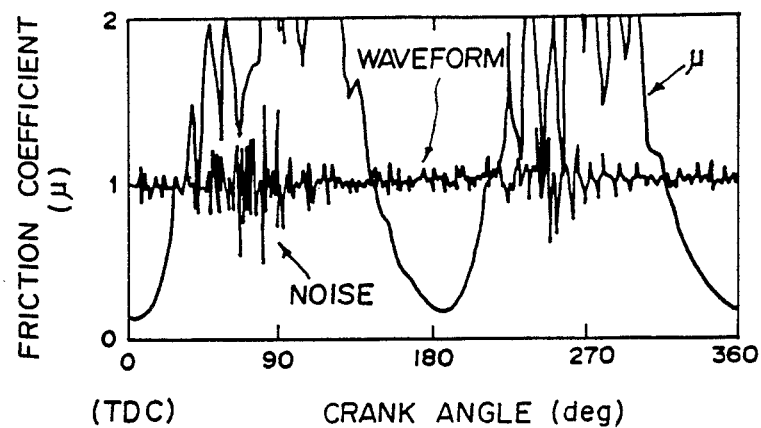

FIG. 7 shows a result of measurement of the relation between the production of the belt noise and the fluctuation in the belt tension. More particularly, FIG. 7 shows a result of measurement of fluctuations in the tension of the main auxiliary mechanism driving belt in the first control (shown in FIG. 6) at the parts between the crankshaft pulley and the power-steering pulley, between the power-steering pulley and the air conditioner pulley, and between the air conditioner pulley and the crankshaft pulley. The tensions at these parts are respectively denoted by T1, T2 and T3 in FIG. 7. FIG. 7(A) shows the fluctuations in the tensions T1, T2 and T3 (the actual tension/set tension) with the crank angle. FIG. 7(B) shows the sound pressure waveform (noise level) and the friction coefficient $\mu$ requirement of the crankshaft pulley 3 obtained on the basis of the tensions T1 and T3.

The tension T1 at the part between the crankshaft pulley 3 and the air conditioner pulley 5 where the belt load is maximum (tight side tension) exhibits a large fluctuation, and the tension T3 (slack side tension) fluctuates in a phase pattern reverse to the fluctuation in the tight side tension T1 and begins to be nullified near the crank angle at which the tension T1 is maximized. This example shows a condition where high noise is produced. The tight side tension T1 becomes lower than the expected normal level (shown by the dashed line in FIG. 7) near the crank angle at which the tight side tension T1 is maximized and the zero-tension period during which the slack side tension is kept nullified is elongated. When the zero-tension period is elongated, the slippage is increased and noise is produced. Our investigation has revealed that the noise is not produced when the rate of the zero-tension period is not larger than 20%.

The slack side tension T3 which closely relates to production of the belt noise is affected by the fluctuation in the tight side tensions T1 and T2. When the auxiliary mechanisms are arranged in accordance with the principle of the present invention, the fluctuation in the tight side tensions can be suppressed whereby the zero-tension period can be shortened and production of the belt noise can be suppressed.

The tension fluctuation in a given auxiliary mechanism layout can be predicted by simulation computation, and on the basis of the predicted tension fluctuation, production of the belt noise in the auxiliary mechanism layout can be predicted.

FIG. 8 shows a flow chart for illustrating an example of such a simulation computation. Static tension is calculated on the basis of various data, e.g., the auxiliary mechanism layout, the auxiliary mechanism load, the inertia moment, the spring constant of the belt, the fluctuation in angular velocity of the crankshaft (steps S1 and S2), and at the same time, dynamic tension is calculated on the basis of various data (steps S1 and S3 to S5). When the layout of the auxiliary mechanisms changes, the data changes. For example, when an auxiliary mechanism having a large rotational inertia force is disposed on the slack side, the spring constant of the belt is reduced. The dynamic tension calculation includes a modal analysis (steps S3), calculation of the pulley speeds (step S4) and calculation of the tension fluctuation (step S5).

Then the resultant tension is calculated on the basis of the results of the static tension calculation and the dynamic tension calculation (step S6), and the rate of zero-tension period of the slack side tension is calculated (step S7). Then the slippage is calculated on the basis of the rate of zero-tension period obtained (step S8) and production of the belt noise is determined on the basis of the slippage (step S9).

When an auxiliary mechanism driving belt comes to produce noise, the belt can be prevented from producing noise by increase of the slack side tension.

Figure 9:
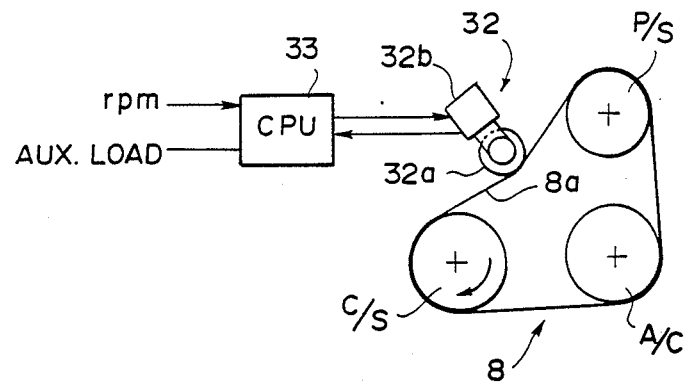

In FIG. 9, a tensioner 32 is provided in contact with the auxiliary mechanism driving belt 8 at the slack side 8a thereof from outside. The tensioner 32 increases the pressure on the belt 8 in order to increase the belt tension when the rate of zero-tension period of the slack side 8a of the belt 8 exceeds a predetermined reference level under the control of a control unit 33. The tensioner 32 comprises a tension roller 32a pressed against the belt 8 at the slack side 8a and an actuator 32b for urging the tension roller 32a against the belt 8.

The actuator 32b may comprise a solenoid which operates under the control of an electric signal output from the control unit 33 and controls the amount of projection of the tension roller 32a toward the belt 8. The control unit 33 calculates the rate of zero-tension period of the slack side 8a of the belt 8 on the basis of the engine speed and the auxiliary mechanism load and outputs the driving signal to the actuator 32b when the rate exceeds the predetermined reference level, thereby increasing the belt tension at the slack side 8a and suppressing production of the belt noise.

Figure 10:
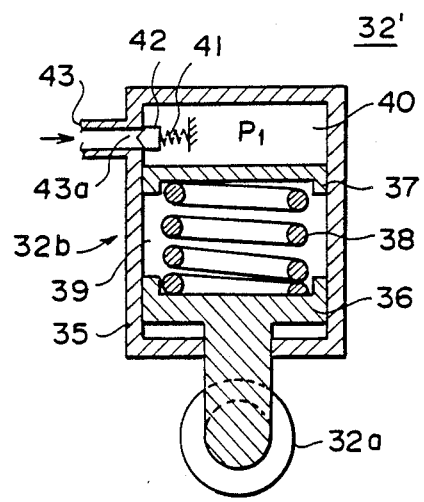
Figure 11:
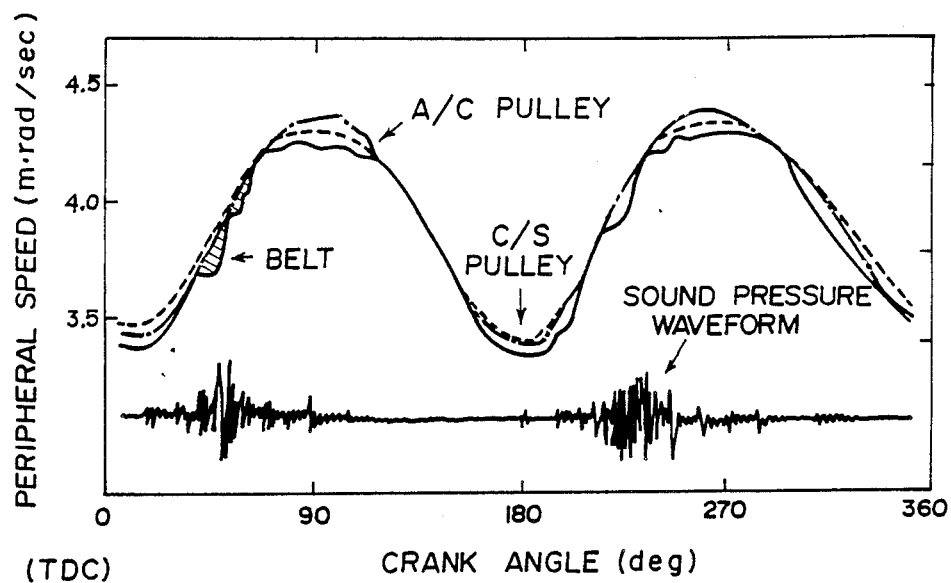

FIG. 10 shows a modification of the tensioner. In the tensioner 32' shown in FIG. 10, the actuator 32b comprises a cylinder 35, a first piston 36 which is received in the cylinder 35 and supports the tension roller 32a, a second piston 37 received in the cylinder 35 and opposed to the first piston 36, and a first spring 38 interposed between the first and second pistons 36 and 37. An inside pressure chamber 39 is defined between the first and second pistons 36 and 37 and an end portion pressure chamber 40 is defined between the second piston 37 and the opposed end of the cylinder 35. A hydraulic pressure passage 43 is connected to the cylinder 35 and opens to the pressure chamber 40. A check valve 42 is provided in the pressure chamber 40 and urged by a second spring 41 to close the opening 43a of the passage 43 to the pressure chamber 40.

When the belt tension is lowered, the tension roller 32a is moved toward the belt under the force of the first spring 38. At this time, the volume in the inside pressure chamber 39 is enlarged and accordingly, the volume in the end portion pressure chamber 40 is enlarged by the hydraulic pressure therein, whereby the hydraulic pressure P1 in the end portion pressure chamber 40 is lowered. When the pressure P1 is lowered, the check valve 42 opens, and a higher hydraulic pressure in the passage 43 acts on the pressure chamber 40, whereby the pressure P1 in the pressure chamber 40 is increased and the force for urging the tension roller 32a toward the belt is enhanced.

The check valve 42 is not opened until the zero-tension period of the slack side continues for a predetermined time interval. This effect is obtained by virtue of the mechanical lag in operation of the first and second pistons 36 and 37, and the first and second springs 38 and 41. The check valve 42 can be arranged to open when the rate of zero-tension period exceeds the predetermined reference level by proper selection of the set load on the first and second springs 38 and 41, the sliding resistance of the first and second pistons 36 and 37, and the like.

We claim:

1. A layout of auxiliary mechanisms for an engine which are driven by a first auxiliary mechanism driving belt passed around a crankshaft pulley integrally mounted on the crankshaft of the engine and auxiliary mechanism pulleys integrally provided on the respective auxiliary mechanisms, characterized in that the auxiliary mechanisms are arranged in the order of rotational inertia force so that the rotational inertia force of the auxiliary mechanism nearest to the crankshaft pulley as seen toward the tight side of the first auxiliary mechanism driving belt from the crankshaft pulley is the largest.

2. A layout of auxiliary mechanisms as defined in claim 1 in which one or more of said auxiliary mechanisms are driven by a second auxiliary mechanism driving belt, the auxiliary mechanisms driven by the first auxiliary mechanism driving belt being arranged in the order of rotational inertia force so that the rotational inertia force of the auxiliary mechanism nearest to the crankshaft pulley as seen toward the tight side of the first auxiliary mechanism driving belt from the crankshaft pulley is the largest, and the rotational inertia force of the auxiliary mechanism nearest to the crankshaft pulley as seen toward the tight side of the second auxiliary mechanism driving belt from the crankshaft pulley is the second largest in the rotational inertia forces of all the auxiliary mechanisms driven by the first and second auxiliary mechanism driving belts.

3. A layout of auxiliary mechanisms as defined in claim 2 in which the number of the auxiliary mechanisms driven by the second auxiliary mechanism driving belt is not larger than the number of the auxiliary mechanisms driven by the first auxiliary mechanism driving belt.

4. A layout of auxiliary mechanisms as defined in claim 3 in which a single auxiliary mechanism is driven by the second auxiliary mechanism driving belt.

5. A layout of auxiliary mechanisms as defined in claim 4 in which the auxiliary mechanism nearest to the crankshaft pulley in the auxiliary mechanisms driven by the first auxiliary mechanism driving belt as seen toward the tight side of the first auxiliary mechanism driving belt from the crankshaft pulley is an air conditioner compressor, and an alternator is driven by the second auxiliary mechanism driving belt.

6. A layout of auxiliary mechanisms as defined in claim 3 in which the inter-pulley lengths of the first auxiliary mechanism driving belt are set so that the inter-pulley length is larger between the pair of pulleys nearer to the crankshaft pulley as seen toward the tight side of the belt from the crankshaft pulley, and the angles of the contact of the first auxiliary mechanism driving belt at the auxiliary mechanism pulleys are set so that the angle of contact is larger at the pulley nearer to the crankshaft.

7. A layout of auxiliary mechanisms as defined in claim 3 in which the auxiliary mechanism nearest to the crankshaft pulley in the auxiliary mechanisms driven by the first auxiliary mechanism driving belt as seen toward the tight side of the first auxiliary mechanism driving belt from the crankshaft pulley is an air conditioner compressor, and an alternator is driven by the second auxiliary mechanism driving belt.

8. A layout of auxiliary mechanisms as defined in claim 1 in which one of said auxiliary mechanisms the rotational inertia force of which is the smallest is driven by a second auxiliary mechanism driving belt which is passed around said one auxiliary mechanism and the auxiliary mechanism the rotational inertia force of which is the largest.

9. A layout of auxiliary mechanisms as defined in claim 8 in which the number of the auxiliary mechanisms driven by the first auxiliary mechanism driving belt is larger than three, the inter-pulley lengths of the first auxiliary mechanism driving belt are set so that the inter-pulley length is larger between the pair of pulleys nearer to the crankshaft pulley as seen toward the tight side of the belt from the crankshaft pulley, and the angles of the contact of the first auxiliary mechanism driving belt at the auxiliary mechanism pulleys are set so that the angle of contact is larger at the pulley nearer to the crankshaft, the inter-pulley lengths and the angles of the contact being so set by virtue of one or more idler pulleys.

10. A layout of auxiliary mechanisms as defined in claim 9 in which said auxiliary mechanism the rotational inertia force of which is the largest is an air conditioner compressor and the auxiliary mechanism driven by said second auxiliary mechanism driving belt is an oil pump for a power-steering system.

11. A layout of auxiliary mechanisms as defined in claim 8 in which the auxiliary mechanism nearest to the crankshaft pulley in the auxiliary mechanisms driven by the first auxiliary mechanism driving belt as seen toward the tight side of the first auxiliary mechanism driving belt from the crankshaft pulley is an air conditioner compressor, and an alternator is driven by the second auxiliary mechanism driving belt.

12. A layout of auxiliary mechanisms as defined in claim 1 in which the inter-pulley lengths of the first auxiliary mechanism driving belt are set so that the inter-pulley length is larger between the pair of pulleys nearer to the crankshaft pulley as seen toward the tight side of the belt from the crankshaft pulley, and the angles of the contact of the first auxiliary mechanism driving belt at the auxiliary mechanism pulleys are set so that the angle of contact is larger at the pulley nearer to the crankshaft, the inter-pulley lengths and the angles of the contact being so set by virtue of one or more idler pulleys.

13. A layout of auxiliary mechanisms as defined in claim 12 in which the auxiliary mechanism nearest to the crankshaft pulley in the auxiliary mechanisms driven by the first auxiliary mechanism driving belt as seen toward the tight side of the first auxiliary mechanism driving belt from the crankshaft pulley is an air conditioner compressor, and an alternator is disposed next to the air conditioner compressor.

14. A layout of auxiliary mechanisms as defined in claim 13 in which a water pump is disposed next to the alternator.

15. A layout of auxiliary mechanisms as defined in claim 13 in which an oil pump for a power-steering system is disposed next to the alternator.

16. A layout of auxiliary mechanisms as defined in claim 1 further provided with a belt tension control means which increases the tension of the first auxiliary mechanism driving belt at the part between the crankshaft pulley and the auxiliary mechanism disposed most remote from the crankshaft pulley as seen toward the tight side of the first auxiliary mechanism driving belt from the crankshaft pulley when the rate of zero-tension period of the part of the first auxiliary mechanism driving belt exceeds a predetermined level.

17. A layout of auxiliary mechanisms as defined in claim 16 in which said belt tension control means detects the rate of said zero-tension period through a dynamic fluctuation in the tension of the first auxiliary mechanism driving belt.

18. A layout of auxiliary mechanisms as defined in claim 16 in which said predetermined level is 20%.

19. A layout of auxiliary mechanism as defined in claim 1 in which the inter-pulley length is larger between the pair of pulleys nearer to the crankshaft pulley as seen toward the tight side of the belt from the crankshaft pulley, and the angles of the contact of the first auxiliary mechanism driving belt at the auxiliary mechanism pulleys are set so that the angle of contact is larger at the pulley nearer to the crankshaft.

20. A layout of auxiliary mechanism as defined in claim 19 in which an air conditioner pulley and an alternator pulley are successively connected to the crankshaft pulley by the first auxiliary mechanism driving belt.

21. A layout of auxiliary mechanism as defined in claim 1 in which said auxiliary mechanism comprises an air conditioner pulley, an alternator pulley and a power-steering pulley, the air conditioner pulley being positioned next to the crankshaft pulley.

22. A layout of auxiliary mechanism as defined in claim 21 in which one of the alternator pulley and power-steering pulley is in contact with the first auxiliary mechanism driving belt, and the other is connected by a second auxiliary mechanism first auxiliary mechanism driving belt.

23. A layout of auxiliary mechanisms as defined in claim 21 in which the alternator pulley is positioned next to the air conditioner pulley, and the alternator pulley and the air conditioner pulley being connected to the first auxiliary mechanism driving belt.

24. A layout of auxiliary mechanisms for an engine comprising:
a first auxiliary mechanism driving belt for driving a first group of auxiliary mechanisms passing around a crankshaft pulley integrally mounted on the crankshaft of the engine and auxiliary mechanism pulleys integrally provided on the respective auxiliary mechanisms; and
a second auxiliary mechanism driving belt for driving a group of remaining auxiliary mechanisms;
wherein the first group of auxiliary mechanisms being driven by the first auxiliary mechanism driving belt is arranged in the order of rotational inertia force so that the rotational inertia force of the auxiliary mechanism nearest to the crankshaft pulley as seen toward the tight side of the first auxiliary mechanism driving belt from the crankshaft pulley is the largest and the number of the auxiliary mechanisms driven by the second auxiliary mechanism driving belt is not larger than the number of the auxiliary mechanisms driven by the first auxiliary mechanism driving belt.

* * * * *